United States Patent [19]

Leboime

[11] Patent Number: 4,546,672
[45] Date of Patent: Oct. 15, 1985

[54] GEAR BOX FOR HIGH POWER VEHICLES

[75] Inventor: Pierre R. Leboime, Paris, France

[73] Assignee: Societe de Procedes et Etudes Soma Minerva, France

[21] Appl. No.: 670,680

[22] Filed: Nov. 13, 1984

Related U.S. Application Data

[63] Continuation of Ser. No. 265,337, May 19, 1981, abandoned.

[30] Foreign Application Priority Data

May 30, 1980 [FR] France .................................. 80 12049

[51] Int. Cl.[4] ............................................. F16H 37/06
[52] U.S. Cl. ........................................ 74/674; 74/753; 74/760
[58] Field of Search ................. 74/674, 753, 760, 761, 74/766, 759, 768, 769

[56] References Cited

U.S. PATENT DOCUMENTS

| | | | |
|---|---|---|---|
| 2,844,975 | 7/1958 | Kelbel et al. | 74/674 X |
| 2,847,877 | 8/1958 | Ravigneaux | 74/759 |
| 3,859,871 | 1/1975 | Uozumi et al. | 74/761 |
| 3,877,320 | 4/1975 | Iijima | 74/753 X |
| 4,089,239 | 5/1978 | Murakami et al. | 74/753 X |
| 4,164,156 | 8/1979 | Reed | 74/753 X |
| 4,228,697 | 10/1980 | Miller | 74/760 X |

Primary Examiner—James A. Leppink
Assistant Examiner—Frank H. McKenzie, Jr.
Attorney, Agent, or Firm—Darby & Darby

[57] ABSTRACT

A chain speed gearing device including a complex planetary train utilizing two sun wheels and two sets of planetary wheels of the Ravigneaux type, combined with a simple planetary train acting as a range doubler and driven by the planet wheel carrier shaft of the Ravigneaux train. The input motion is performed on the annulus of the Ravigneaux train for at least one of the speeds of the train by stoppage of the first sun wheel the output being taken from the planet wheel carrier of the Ravigneaux train. The speed of the direct drive is obtained by simultaneous input on one of the sun wheels of the Ravigneaux train and on the annulus, and by taking the output from the planet wheel another speed may be obtained by input on the second sun wheel and stoppage of the other sun wheel and by taking the output from the planet wheel carrier. Reverse motion is provided by input on the second sun wheels, stoppage of the annulus and output by the planet wheel carrier. The output shaft of the gear change speed device is coaxial with the sun wheels making it a particularly compact transmission.

5 Claims, 4 Drawing Figures

GEAR BOX FOR HIGH POWER VEHICLES

This is a contintion of application Ser. No. 265,337, field May 19, 1981 now abandoned.

FIELD OF THE INVENTION

The present invention relates to a change-speed gear box or transmission case for high power vehicles, such as military vehicles (in particular armoured combat vehicles), or heavy duty units (for public or agriculatural works) or also transportation vehicles (trucks, motor coaches, motor buses).

The gear boxes of such vehicles have to be as compact as possible and they generally use sun and planet gear devices which are, in principle, the less bulky.

For some vehicles, for example the armoured units, the devices forming the gear box have to be preferably co-axial with the output shaft extending through the gear box and they receive their motion via a spur or bevel type gearing. In other cases, such as trucks, buses and coaches for example, it is preferable that the gear box has its input and its output in alignment.

BACKGROUND OF THE INVENTION

For meeting the requirements of such vehicles, many combinations have already been proposed.

The most elementary is made of a motion reversal device comprised of a planetary gear reverser followed by 3 simple planetary trains and a direct drive: thus are obtained 4 forward speeds and 4 reverse speeds. But since the reversing gear made of planetary gears comprises itself two planetary trains, this leads to an assembly comprising 5 planetary trains resulting in a highly complex mechanical system which does not allow a compact assembly.

According to another combination, a reversing planetary gear is used, followed by two simple planetary trains supplying each twice 2 combinations.

This solution is more modern but, as the previous one, is limited to 4 cominbations for the forward motion, which is insufficient in many cases, particularly in the case of trucks and other modern transportation vehicles.

OBJECTS AND SUMMARY OF THE INVENTION

An object of the present invention is a gear box which remedies these disadvantages.

The gear box according to the invention is characterized in that it comprises a complex planetary train with 2 sun wheels and 2 series of planet wheels, so-called "Ravigneaux train", combined with a simple planetary train playing the part of a range doubler and driven by the planet-wheel carrier shaft of the Ravigneaux train, the input of the motion being down on the crown or annulus of the Ravigneaux train for at least one of the speeds of said train.

Preferably, one of the speeds of the Ravigneaux train is obtained by input on the annulus, stoppage of the sun wheel (first sun wheel) meshing with the planet wheels which mesh with the annulus (first planet wheels) and output via the planet-wheel carrier, the speed of the direct drive being obtained by simultaneous input on the second sun wheel and on the annulus which are thus rigidly connected to each other, a slow speed being obtainable by input on the second sun wheel, stoppage of the first sun wheel and output on the planet-wheel carrier and the reverse motion being provided by input via the second sun wheel, stoppage of the annulus and output via the planet-wheel carrier.

Indeed, in the known Ravigneaux train the motion input is done on one or the other of the planetary gears. If used as such, this combination will give only, for the slow speed, a high gear ratio, over 2.7 about, requiring a large sized planetary range doubler for absorbing the engine torque, which is multiplied by 2.7 or more. Moreover, since in such devices two reverse speeds at least have to be available, with a high ration of 2.7 about, a doubling train providing a gear ration of 2.7 about has to be provided and the total gear ratio (the ratio of the gear box) would then be very high since it is the product of the ratios of two trains, viz. 7.3 at least, when they should not exceed 6 for transportation vehicles and 4.5 for military vehicles of the armoured type.

By contrast and with the arrangement of the invention, 6 forward speeds conveniently staged in a ratio of about 1 to 6 and 2 reverse speeds in a ratio of the order of 2.7 or more can be obtained, with a doubling train the size of which is limited to the needs of a gear ratio of the order of 1.8.

Moreover, owing to said arrangement, there is obtained a 6 forward speeds and 2 reverse speeds box comprising only 2 planetary trains (one of which being a composed train) 3 brakes and 3 clutches, which is particularly adapted to a simple and compact construction.

Finally, this embodiment leads to a minimum of the rotation speeds of the planet wheels, of backlash as well as flippings of clutches and brakes.

Further objects of the invention are the following arrangements:

(a) The input of the motion on the Ravigneaux train comprises two clutches allowing to drive at will either the annulus or the second sun wheel, or both.

(b) A brake is provided on the first planet wheel and another on the annulus of the Ravigneaux train.

(c) The doubling train comprises a brake on the annulus and a clutch between sun wheel and annulus, the planet-wheel carrier being connected to the output shaft.

(d) According to a first alternative, the planet-wheel carrier of the Ravigneaux train is placed between the first and the second sun wheels, the first sun wheel being mounted on a sleeve surrounding the planet-wheel carrier shaft and its brake being situated between the Ravigneaux train and the doubling train.

(e) According to another alternative, the planet-wheel carrier of the Ravigneaux train is directly coupled to the doubling train and its first sun wheel is mounted on a sleeve surrounding the output shaft extending through the box, and inside the driving shafts of the second sun wheel and of the annulus, the brake of said first planetary train being placed at the end of the gear box opposite the doubling train.

(f) According to an alternative embodiment, the input and the output of the motion are in alignment, whereby the mounting of the planet-wheel carrier of the Ravigneaux train can be made according to one or the other of the hereabove points (d) and (c).

(g) According to a further alternative, the output shaft extends through the gear box, the mounting of the planet-wheel carrier of the Ravigneaux train is made according to the hereabove point (e) and the motion input in the box is carried out by a spur or bevel type gearing on the clutches of the annulus and of the second sun wheel.

BRIEF DESCRIPTION OF THE DRAWINGS

The invention will become more apparent from the following description with reference to the appended drawings wherein.

DETAILED DESCRIPTION OF THE EMBODIMENTS

Figure 1:
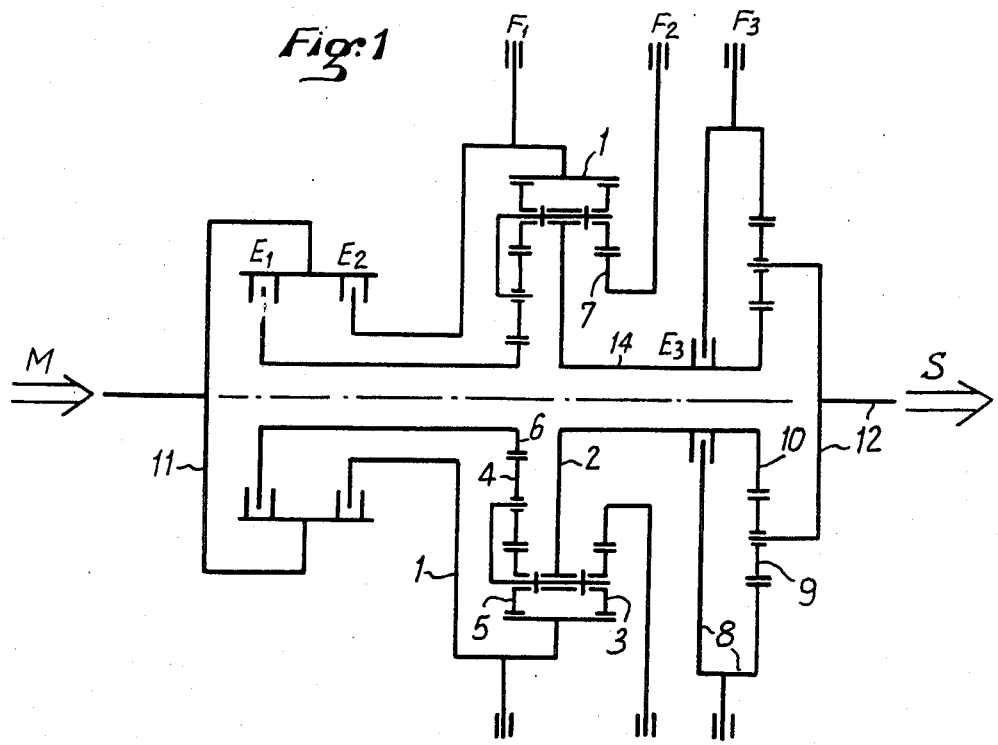
FIG. 1 is a principle diagram of a first embodiment of the invention.

Reference being made to said Figures, the gear box according to the invention is made of a Ravigneaux train comprising:

an annulus 1, the first planet wheels 3 and 5 whish mesh with the annulus 1 and can be or no rigidly connected between themselves according to the manufacture requirements, the second planet wheels 4 which mesh with the planet wheels 5 and the sun wheel 6, the second sun wheel 6, the first sun wheel 7 which meshes with the planet wheels 3, the planet-wheel carrier 2 which connects to each other the planet wheels 3, 5 and 4 and which forms the output of the Ravigneaux train and which is combined with a simple sun and planet gear playing the part of range doubler, comprising:

the annulus 8, the sun wheel 10, the planet wheels 9, the planet-wheel carrier 12 forming the output S of the gear box.

The input M of the gear box is provided through the clutches $E_1$ and $E_2$ respectively connecting said input to annulus 1 and to the second sun wheel 6 of the Ravigneaux train. When the two clutches $E_1$ and $E_2$ are simultaneously operated, the Ravigneaux train is in direct drive.

There is moreover provided:

a brake $F_1$ acting on annulus 1, a brake $F_2$ acting on the first sun wheel 7, a brake $F_3$ acting on the annulus 8, a clutch $E_3$ between the sun wheel 10 and the annulus 8 which puts the doubling train in direct drive.

By acting on said brakes and clutches, the following combinations are obtained:

1st forward speed by acting on $E_1$ $F_2$ $F_3$
2nd forward speed by acting on $E_2$ $F_2$ $F_3$
3rd forward speed by acting on $E_1$ $E_2$ $F_3$
4th forward speed by acting on $E_1$ $F_2$ $E_3$
5th forward speed by acting on $E_2$ $F_2$ $E_3$
6th forward speed by acting on $E_1$ $E_2$ $E_3$
1st reverse speed by acting on $E_1$ $F_1$ $F_3$
2nd reverse speed by acting on $E_1$ $F_1$ $E_3$ $$\text{If } K_1 = \frac{\text{number of teeth of annulus 1}}{\text{number of teeth of sun wheel 6}}$$

$$K_2 = \frac{\text{number of teeth of annulus 1}}{\text{number of teeth of sun wheel 7}}$$

-continued $$K_3 = \frac{\text{number of teeth of annulus 8}}{\text{number of teeth of sun wheel 10}}$$

The ratios of the hereabove combinations are the following:

$$\text{for the first forward speed: } \frac{K_1}{K_2} + 1 \, (K_3 + 1)$$

$$\text{for the second forward speed: } \frac{K_2 + 1}{K_2} (K_3 + 1)$$

For the third forward speed: $K_3 + 1$ $$\text{For the fourth forward speed: } \frac{K_1}{K_2} + 1$$

$$\text{For the fifth forward speed: } \frac{K_2 + 1}{K_2}$$

For the sixth forward speed: 1
For the first reverse speed: $(K_1 - 1)(K_3 + 1)$
For the second reverse speed: $K_1 - 1$ By way of example and in the case of trucks, buses, coaches or other transporation vehicles and when adopting $K_1 = 2.5$ $K_2 = 2.5$ and $K_3 = 1.8$, there is obtained:

1st FW 5.6
2nd FW 3.92
3rd FW 2.8
4th FW 2
5th FW 1.4
6th FW 1
1st RV 4.2
2nd RV 1.5 viz. 6 speeds prefectly staged between 1 and 6 and 2 reverse speeds with a ration of 2.8.

In the case of an armoured unit and other military vehicles or heavy duty units, by adopting $K_1 = 2.89$ $K_2 = 1.73$ and $K_3 = 1.85$, there is obtained:

1st forward speed 7.6
2nd forward speed 4.49
3rd forward speed 2.85
4th forward speed 2.67
5th forward speed 1.58
6th forward speed 1
1st reverse speed 5.38
2nd reverse speed 1.89

The fourth forward speed could be omitted as a duplication of the third and the first forward speed could be used as a so-called "creeping" forward speed, which is very slow, with a small engine injection, thereby providing four main forward speeds corresponding in the hereabove table to the 2nd, 3rd, 5th and 6th speeds with a gear ratio of the order of 4.5 for a maximum speed of 70 km/h.

Figure 2:
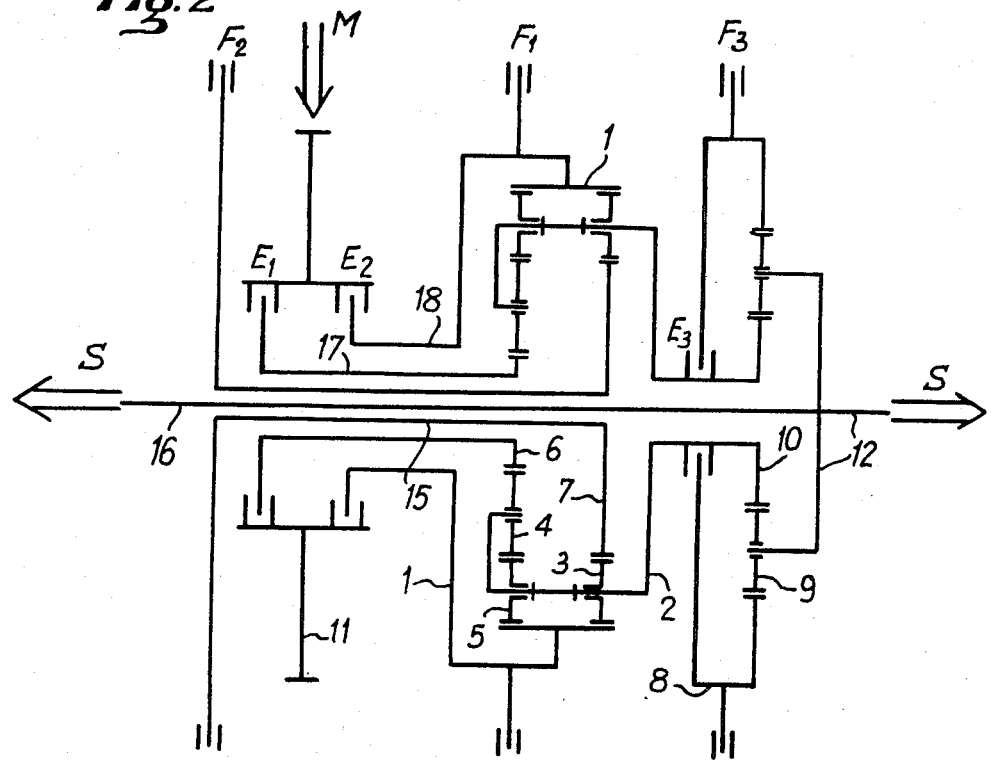
FIG. 2 is a principle diagram of a second embodiment of the invention.
Figure 3:
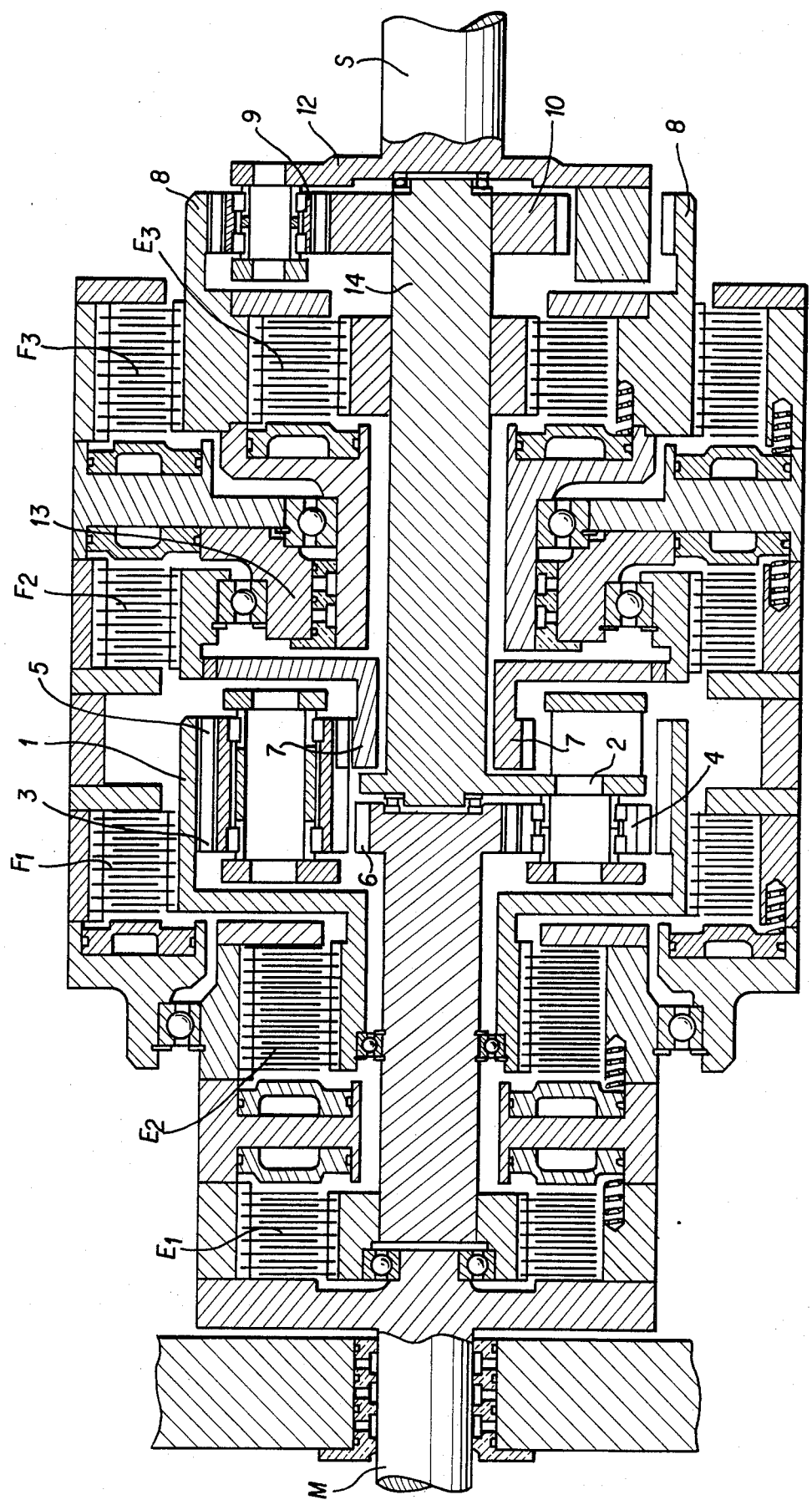
FIGS. 3 and 4 are simplified sectional views of embodiments of the gear boxes according to the diagrams of FIGS. 1 and 2 respectively.
Figure 4:
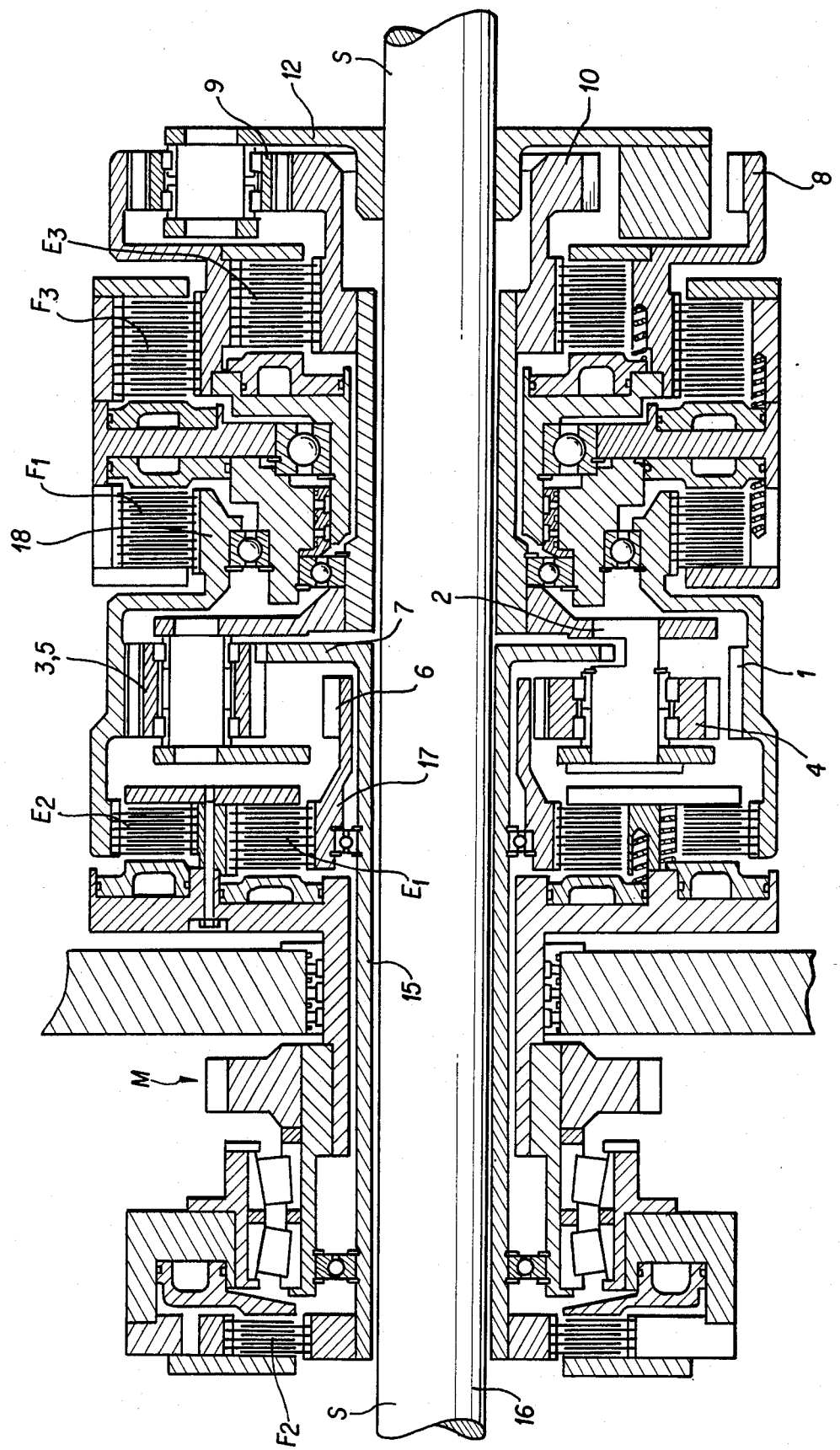

In the examples of FIGS. 1 to 3, the input M and the output S of the box are in alignment; in the example of FIGS. 2 and 4, the output shaft 16 extends through the box and the input M is provided by a gear 11 which can be a spur or bevel type clutch.

For allowing the input or the output in alignment in the case of FIGS. 1 and 3, a planet-wheel carrier 2 of the Ravigneaux train is placed between the planet wheels 3 and 5, between the sun wheels 6 and 7, the sun wheel 7 being journaled about shaft 14 of the planet-wheel carrier 2; the brake $F_2$ of the planet-wheel carrier is placed between the Ravigneaux train and the doubling train.

In the case of FIGS. 2 and 4, the first sun wheel 7 of the Ravigneaux train is mounted on a sleeve 15 surrounding the output shaft 16 and inside parts 17 and 19 carrying the second sun wheel 6 and the annulus 1; the brake F₂ is then placed on the side of the box which is opposite the doubling train.

However, the solution of FIG. 1 can also be used in the case of an output shaft extending through the box.

The input and output shafts in alignment provide a solution which is well adapted to the case of many transportation vehicles; the output shaft which extends through the box is convenient for armoured vehicles for example.

Obviously, the gear box which is the object of the invention is only one of the elements of a transmission and can be formed of any other usual transmission elements. In particular, it can be placed after the hydrokinetic torque converter or a coupler of some sort (mechanical or hydraulic); it can also be placed in front of other devices such as a transfer mechanism or axle (as regards wheeled vehicles), an output reducer with a steering device (as regards tracked devices).

I claim:

1. A change speed gear device comprising:
   an input shaft for receiving rotational motion;
   first gear train means having a first annulus, first and second planet wheel sets mounted on a first planet wheel carrier means, said first planet wheel set being meshed with said first annulus, first and second sun wheels meshed with said first and second planet wheel sets, said second planet wheel set being engaged between said second sunwheel and said first planet wheel set;
   means for stopping said first sun wheel;
   first and second clutch means coupled between said input shaft and said first annulus and said input shaft and said second sun wheel, respectively, for selectively driving said annulus and said second sun wheel;
   means for stopping said annulus;
   doubling train means comprising a third planet wheel set, including a second planet wheel carrier, third sun wheel and second annulus, said doubling train means further comprising means for stopping said second annulus and a third clutch means for selectively coupling said third sun wheel to said second annulus;
   intermediate shaft means coupled to said first planet wheel carrier and said third sun wheel for transmitting rotational motion therebetween, said first planet wheel carrier and said first annulus being rotatable thereabout; and
   an output shaft coupled to said said second planet wheel carrier, coaxial therewith and with said first and second sun wheels and coaxial with said intermediate shaft.

2. A gear box according to claim 1, wherein the planet-wheel carrier of the gear train is placed between the first and the second sun wheels, the first sun wheel being mounted on a sleeve surrounding the planet-wheel carrier shaft and said first stopping means being situated between the gear train and the doubling train.

3. A gear box according to any one of claim 1, wherein the planet-wheel carrier of the gear train is directly coupled to the doubling train and said first sun wheel is mounted on a sleeve surrounding the output shaft extending through the box, and inside a driving shaft of the second sun wheel and of the annulus, the brake of said first planetary train being placed at the end of the gear box opposite the doubling train.

4. A gear box according to any one of the preceding claims, wherein said input and output shafts are coaxially aligned.

5. A gear box according to claim 3 or 1, wherein the output shaft extends through the gear box, and the motion input is carried out by gearings on the clutches of the annulus and of the second sun wheel of the Ravigneaux train.

\* \* \* \* \*